May 1, 1962 R. L. ALLEN ET AL 3,032,151

FLEXIBLE SUPPORT MEMBER

Filed Oct. 26, 1959

ROBERT L. ALLEN
ROBERT H. HART
*INVENTORS*

BY

*ATTORNEYS*

United States Patent Office 3,032,151
Patented May 1, 1962

3,032,151
FLEXIBLE SUPPORT MEMBER
Robert L. Allen, Atlanta, Ga., and Robert H. Hart, Beloit, Wis., assignors, by mesne assignments, to the United States of America as represented by the Secretary of the Navy
Filed Oct. 26, 1959, Ser. No. 848,879
2 Claims. (Cl. 189—34)

The present invention relates to flexible support members and more particularly to elongated support members having an inherent tendency to assume a rectilinear state and sufficiently flexible to permit coiling.

The primary object of the invention is to provide a light structural beam member which will support loads and be torsion resistant when unconstrained and can be coiled for reduced space requirements when not in use.

Another object of the invention is to provide a tape-like member which is sufficiently flexible to be coiled and whose structure contributes sufficient stiffness to support itself in cantilever fashion for a longer extended length than the conventional concavo-convex measuring tape and the like.

Other objects and many of the attendant advantages of the invention will become apparent from the following description when read in connection with the accompanying drawing in which.

Figure 1:
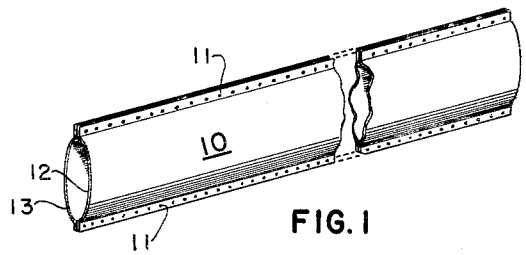
FIG. 1 is a fragmentary perspective of a flexible support member according to the invention.
Figure 2:
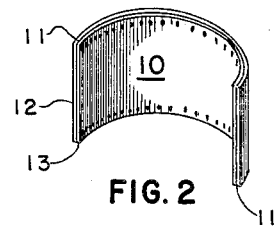
FIG. 2 shows a portion of the member of FIG. 1 in curved condition.

The preferred embodiment of the invention shown in FIGS. 1 and 2 comprises a tubular ribbon 10 of lenticular cross section formed of thin flexible spring material, such as spring tempered steel, and having coplanar fins 11 integral with its longitudinal edges. As here shown the flexible member 10 is made of two strips 12 and 13 of flat spring material joined along their margins, as by welding or the like, and the central portions of which have been given opposite transverse curvatures, i.e., camber, by forming so that in its relaxed or unstressed condition the member 10 has an inherent tendency to assume and maintain a rectilinear state. When the member 10 is coiled its convolutions temporarily lose their lenticular cross section and flatten out as shown in FIG. 2 and in doing so stores substantial amounts of spring energy which is available to uncoil the member 10 to a straight condition whenever constraint is removed. The opposing camber provided in the tubular walls of the member 10 increases the second moment of area of the section by reason of material being displaced from the neutral axis. The resulting air space is lenticular but need not be bounded by circular arcs.

Figure 3:
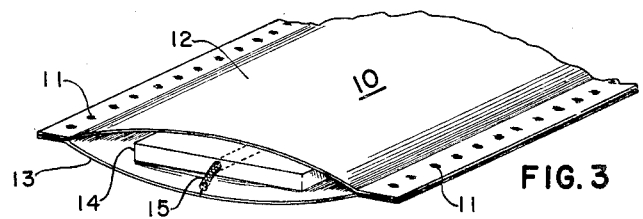
FIGS. 3 and 4 are perspective illustrations of a modified form of the invention in rectilinear and curved states respectively.
Figure 4:
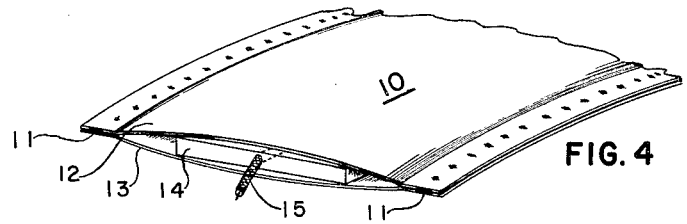

The embodiment of the invention illustrated in FIGS. 3 and 4 differs from the one shown in FIGS. 1 and 2 by having a flat tape 14 disposed within the center of the tubular ribbon 10 to act as a spacer. The spacer 14 preferably has negligible spring properties and may be of any suitable material such as nylon. The spacer 14 causes a greater resistance to coiling or bending of the member 10 because it keeps the stressed walls 12 and 13 farther from the neutral axis when the member 10 is in a curved position. In those applications where it is desired an electrical conductor 15 may be incorporated in the spacer 14.

The dimensions of the member 10 and of the material used in its construction depend upon the strength desired and the radius of the circle into which it is to be coiled or rolled. In the apparatus in which the invention was reduced to practice the flexible member 10 was constructed of tempered stainless steel 2 inches wide, .008 inch thick and 40 inches long, the welded margins were approximately 3/16 inch wide and the camber (the greatest separation of the walls 12 and 13) about 3/16 inch. An arm or member 10 of these approximate dimensions was rolled onto a 10-inch diameter drum without permanent deformation and when constraint was removed the member 10, which was mounted to uncoil in a horizontal plane, uncoiled with a weight of one pound supported at its free end.

While the contemplated use for which the flexible member of the invention was developed required a relatively robust structure it will be obvious that its dimensions can be chosen so as to fulfill more modest needs such for example as tapes which are repeatedly reeled and unreeled in automatic plotting apparatus, straight edges, supporting arms for lamps and, generally speaking, as carrying or self supporting rods in all such cases where it is of importance to reduce the volume of a relatively stiff rod for storage purposes.

The transversely curved strips 12 and 13 may be so formed either before or after welding along their margins 11 and of course a single strip of double width may be folded on itself to provide the double strips 12 and 13. Although the flexible member of the invention may be fabricated in many ways and from different materials, when spring tempered metal is utilized it is preferred to employ the method disclosed in application Serial No. 19,133 filed March 31, 1960, by Robert H. Hart et al., said Hart being one of the present inventors.

While for the purpose of disclosing the invention the preferred embodiments thereof have been described in detail it will be understood that the invention is not limited thereto but is of the scope of the appended claims.

What is claimed is:

1. A longitudinally flexible tubular support structure comprising two mated strips of thin spring material disposed in face to face relation and each having coplanar parallel margins along its length permanently joined to the mating margins and a central section transversely bowed outwardly from the plane of its margins with an inherent natural radius of curvature so that in its relaxed condition the structure is a substantially straight tubular member, transversely rigid and torsion resistant and when flexed longitudinally into a coil the bowed sections will be moved toward the plane of said margins thus storing substantial amounts of spring energy.

2. A flexible support structure consisting when unconstrained of a substantially straight elongated tubular member having a lenticular cross section with the walls thereof free to move toward each other and integral fins extending laterally in the plane of its longitudinal edges and being made of thin spring material, the structure being such that when flexed into a coil the two tubular walls are flattened, the outer tubular wall is placed in tension longitudinally, the inner tubular wall is placed in compression longitudinally and both of said walls are placed in compression transversely.

References Cited in the file of this patent

UNITED STATES PATENTS

| 401,135 | Cliff | Apr. 9, 1889 |
| 722,398 | Block | Mar. 10, 1903 |
| 940,873 | Hanrath | Nov. 23, 1909 |
| 1,713,891 | Dooley | May 21, 1929 |
| 1,947,392 | Gunthermann et al. | Feb. 13, 1934 |
| 2,759,574 | Miller | Aug. 21, 1956 |
| 2,851,270 | Ball | Sept. 9, 1958 |

FOREIGN PATENTS

| 793,334 | France | Nov. 16, 1935 |